United States Patent [19]

Gradert

[11] Patent Number: 5,119,895
[45] Date of Patent: Jun. 9, 1992

[54] APPARATUS FOR GENERATION OF A WEIGHT-DEPENDENT SIGNAL

[75] Inventor: Detlef Gradert, Nienhagen, Fed. Rep. of Germany

[73] Assignee: WABCO Westinghouse Fahrzeugbremsen GmbH, Hanover, Fed. Rep. of Germany

[21] Appl. No.: 651,595

[22] Filed: Feb. 6, 1991

[30] Foreign Application Priority Data

Feb. 8, 1990 [DE] Fed. Rep. of Germany ....... 4003746

[51] Int. Cl.$^5$ .............................................. G01G 5/04
[52] U.S. Cl. .................................. 177/208; 177/212; 177/141
[58] Field of Search ......................... 177/208, 212, 141

[56] References Cited

U.S. PATENT DOCUMENTS

| | | | |
|---|---|---|---|
| 4,062,415 | 12/1977 | Miller | 177/208 |
| 4,832,141 | 5/1989 | Perini et al. | 177/141 |
| 4,875,534 | 10/1989 | Kunz | 177/212 |
| 4,917,198 | 4/1990 | Sing | 177/208 X |

Primary Examiner—Benjamin R. Fuller
Assistant Examiner—R. W. Gibson
Attorney, Agent, or Firm—Horst M. Kasper

[57] ABSTRACT

An apparatus for generating a signal, dependent on the weight of an object, is provided for an air-suspended vehicle. Control processes of the air-suspended vehicle with automatic levelling control unit correct road conditions, such as, for example, curve inclinations, influencing the suspended weight. According to conventional apparatuses, the suspended weight is determined by the measurement of the pressure in the air suspension. This requires additional measurement and signal transfer means. The invention apparatus is to generate a signal corresponding to the suspended weight under use of the distance values stored in the automatic levelling control unit. The automatic levelling control unit (8) is structured such that it generates during automatic control an additional signal, dependent on the temporary change of the distance value. The additional signal serves as the signal dependent on the suspended weight.

22 Claims, 3 Drawing Sheets

APPARATUS FOR GENERATION OF A WEIGHT-DEPENDENT SIGNAL

BACKGROUND OF THE INVENTION

1. Field of the Invention

A distance measurement device measures the changing distance between the spring-supported bodywork and the vehicle axle in air-suspended vehicles with automatic levelling control unit.

2. Brief Description of the Background of the Invention Including Prior Art

The changing distance of the spring supported bodywork from the vehicle axle is based on a loading and an unloading of the vehicle. The measurement data of the distance measurement device are compared with an automatic levelling control unit to a set value referring to a reference level. In case of a deviation, the reference level is reinstated by a pressurizing or a venting of the air suspension. For a pressurizing of the air suspension, the automatic levelling control unit switches a solenoid control valve between the pressure means source and the air suspension to open a passage and causes the pressure means source to supply air into the air suspension until the automatic levelling control unit recognizes the reference level indicated by the distance measurement device. Thereupon, the air supply is discontinued and the solenoid control valve is closed. The venting occurs in such a way that the automatic levelling control unit switches the solenoid control valve to open passage into the atmosphere. The air suspension is then vented into the atmosphere for such time until the automatic levelling control unit blocks the connection to the atmosphere upon recognition of reaching of the reference level.

In addition to the reference level value, additional load-dependent values are automatically controllable such as, for example, damping and absorbing of driving vibrations. Depending on the suspended vehicle weight, for example, the damping and absorbing devices used for this purpose are influenced, such that the damping and absorbing properties and thus the driving comfort and the driving safety are retained for all possible weight situations.

In other automatic control devices, dependent also on the suspended vehicle weight, such as, for example, automatic load-sensing valves, an automatic control of the brake force of compressed-air brake cylinders at air-suspended vehicles with automatic levelling control unit is performed dependent on the air suspension bellows pressure. The load-sensing valve is controlled directly, like a relay, by the pressure of the air suspension bellows. However, additional mechanical means are required for the transformation of the air-suspension bellows pressure into a control signal usable by the load-sensing valve such as, for example, a control curve and a transfer element engaging the control curve.

The suspension bellows or the pressure line connected to the suspension bellows are to be furnished with additional measurement and signal transfer means for a transformation of the air-suspension bellows pressure into an electrical signal which is to correspond to the weight loading the air suspension. In addition to an increased expense of the device, this additional installation is associated with the disadvantage of increasing possible interference sources.

The German Printed Patent Document DE-OS 39 15 966 to Atsushi Mine et al. teaches a method and a device for the control of an active fluid-suspension system of a motor vehicle. While the reference teaches that the control unit 6 calculates the air amount to be entered into the suspension unit, there is no teaching in this reference for determining the weight of the load of the vehicle.

The German Printed Patent Document DE-OS 38 18 188 to Robert Schüssler teaches an active suspension system. The reference teaches to calculate a correction of the support forces of the support aggregate 10 of the vehicle. However, the reference does not teach to determine the weight of the load of a vehicle.

The German Printed Patent Document DE-OS 38 15 612 to Matthias Fahrnschon et al. teaches a method for the control of a compressed air supported vehicle suspension. The reference teaches a system which takes care that the pressure difference between the air suspension elements 1 and 2 is lower. No teaching is seen in this reference relating to weight determination of the load of the vehicle.

The German Printed Patent Document DE-OS 35 25 835 to Roland Blanz teaches a device subjectable to the motions between the vehicle chassis and the vehicle axles at motor vehicles. The reference teaches to employ a path sensor 23 for furnishing an electrical signal corresponding to the path of a linkage. The reference does not contribute to the measurement of a weight of a load of a vehicle.

The German Printed Patent Document DE-OS 2,306,154 to Regie Nationale des Usines Renault teaches a combined device for correcting of the braking and of the vehicle position in road vehicles. While the reference teaches obtaining of a correction of the position of a motor vehicle relative to the road, no suggestion is made as to determining the weight of a load of a vehicle.

The U.S. Pat. No. 4,832,141 to Richard L. Perini et al. teaches vehicle mounted load indicator system. The system employs air bags and pressure changes in air bags and a first conduit serving the air bags are communicated to a transducer or the like by a second circuit. A readout device is located in the vehicle operator station. The readout device displays the weight of the load on the platform and is adapted for use with different-sized air bag components. While the reference teaching refers to the determining of pressure changes in air bags, there is no teaching in this reference as to an automatic control of the level of the chassis box versus the axles.

SUMMARY OF THE INVENTION

Purposes of the Invention

It is an object of the present invention to furnish a device for generating of a signal, dependent on the air-suspended vehicle weight, without a detour over the air-suspension pressure, from data available from the automatic levelling control unit, where an installation of additional measurement and signal transfer means is not necessary.

It is another object of the present invention to determine the relative weight of a box body.

It is a further object of the present invention to furnish means for maintaining a substantially constant distance between axle and box body of a vehicle.

These and other objects and advantages of the present invention will become evident from the description which follows.

Brief Description of the Invention

According to the present invention, there is provided for an apparatus for generating a signal dependent on a weight of an object. An air suspension supports the object and is connected to a pressure source for pressurizing the air suspension with air and to a discharge port for venting the air from the air suspension into the ambient atmosphere. A distance measurement device is employed for generating a distance value dependent on the distance of the reference point relative to the reference level. An automatic control unit for level adjustment is connected to the distance measuring device for generating an additional signal dependent on a temporary change of a distance value during the time during which the reference point approaches the reference level during an automatic control operation. Said automatic control unit serves for controlling a reference point subjected to the influence of the weight of the object and movable in a vertical direction to a reference level by pressurizing and venting of the air suspension. The additional signal serves as a signal dependent on the weight of the object.

A comparison circuit can be connected to the automatic control unit for level adjustment. The distance measurement device can be disposed at and coordinated to the automatic control unit for level adjustment for generating a distance path length value.

A comparison circuit can be connected to and disposed at the automatic control unit for level adjustment. Storage means can be connected to the comparison circuit for storing characteristics of the air volume streams, fed to the air suspension or discharged by the air suspension, for ready availability of said characteristics for comparison purposes with the signal dependent on the weight of the object.

A physical parameter value of the generated signal can depend substantially linearly on the weight of the object. A physical parameter value of the generated signal can assume positive and negative values dependent on a positive/negative sign of a difference between the weight of the object and a preset reference weight.

The automatic control unit can comprise a differentiating means for differentiating the measured signal value dependent on time. The automatic control unit can produce a second signal derived from the differentiating means for immediately furnishing the weight of the load determined by the system.

The apparatus for generating of a weight dependent signal can be used as an electronic levelling control.

The apparatus for generating of the weight dependent signal can be used to maintain horizontal bodywork at a preset and at a present level, even where the vehicle load is not spread evenly. The bodywork can be maintained at a constant level for loading ramp operation without requiring any manual readjustment of the bodywork position. An automatic traction aid can be furnished by the apparatus for generation of the weight-dependent signal of the present invention. Full use can be made of the permissible gross axle weight ratings according regulatory requirements by using the traction control features in association with the apparatus for generating of a weight-dependent signal. The raising and lowering times of the horizontal bodywork can be minimized. The air consumption can be held negligible since a short time dynamic spring deflection would not influence the control process. The apparatus for generation of a weight-dependent signal can be constructed for infrequent and easy maintenance.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawings, in which are shown several of the various possible embodiments of the present invention.

DESCRIPTION OF INVENTION AND PREFERRED EMBODIMENTS

Figure 1:
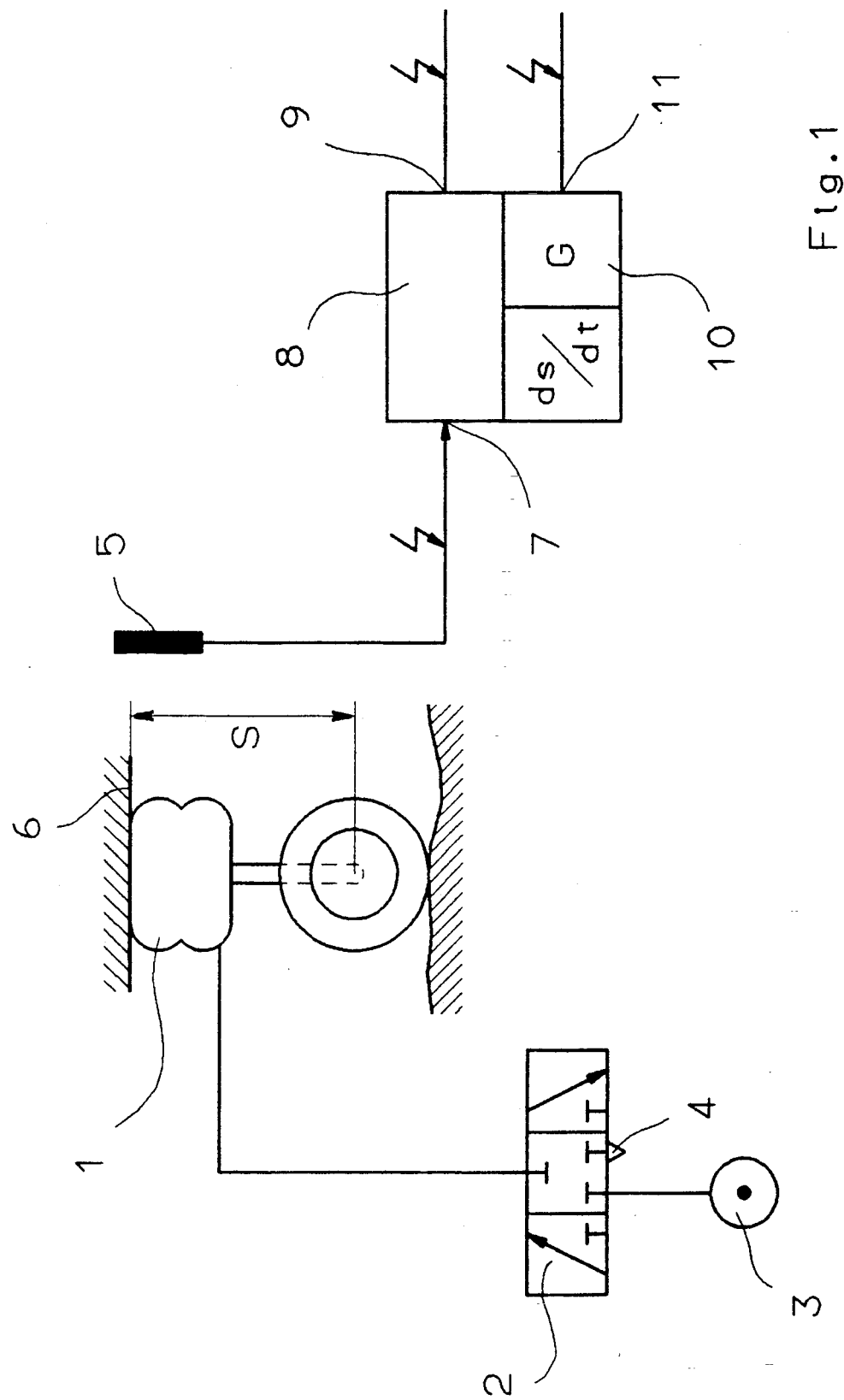
FIG. 1 is a schematic view of a representation of an automatic levelling control unit with a device for the generation of a signal dependent on the suspended weight of an object.

It is a feature of the invention to generate a signal, which corresponds to the weight which is experienced by a loaded air suspension.

According to the invention, there is provided for an apparatus for generating a signal, where the signal depends on a weight of an object. An air suspension supports the object and can be connected to a pressure source for pressurizing and to a discharge to the atmosphere for venting. An automatic levelling control unit, which serves for controlling a measurement point, is adjustable under the influence of the weight of the object to a reference level, by pressurizing and by venting of the air suspension. A distance measurement device is employed for generating a distance value dependent on the distance of the measurement point relative to the reference level. The automatic levelling control unit 8 is structured such that it generates an additional signal, dependent on the temporary change of the distance value S during the time during which the measurement point 6 approaches the reference level during automatic control. The additional signal serves as a signal dependent on the weight of the object.

A distance measurement device 5, disposed at and coordinated to the automatic levelling control unit 8, can serve for generating a distance value.

The automatic levelling control unit 8 can exhibit a comparison circuit 10. The characteristics of the volume streams, fed to the air suspension 1 or discharged by the air suspension 1, can be stored in the comparison circuit 10. Said characteristics can be available for comparison purposes with the signal dependent on the weight of the object.

FIG. 1 illustrates a suspension 1, which is symbolically represented and includes all air-suspension structures of the vehicle. The air suspension 1 can be connected via a solenoid control valve 2 for pressurizing with a pressure means source 3 and for a venting with an exhaust 4 to the atmosphere. The distance measurement device 5 measures and determines the distance of a measurement point 6 at the suspended mass from a preset reference level, for example, with reference to the wheel axle. In case of a deviation, generated by loading or unloading and measurable as a measurement signal S, the distance measurement device 5 emits a corresponding distance signal to a signal input 7 of an automatic levelling control unit 8. A signal, corresponding to the distance signal, can be fed to the solenoid control valve 2 and to the pressure means source 3 via control outputs 9 of the automatic levelling control unit 8.

According to the distance signal, the automatic levelling control unit 8 brings the solenoid control valve 2 or, respectively, the pressure means source 3 into switch positions where the proximation of the measurement point 6 to the preset reference value is performed by pressurizing or venting of the air suspension 1.

The automatic levelling control unit 8 is structured such that it generates an additional signal during the time period during which the measurement point 6 approximates the reference level during levelling operations. This additional signal is dependent on the temporary change of the distance value. This additional signal is also a signal which depends on the weight of the object. The distance measurement device 5 which is a part of the automatic levelling control unit device 8 serves for a generation of the distance value S. The distance value S results through a deviation of the measurement point 6 from the reference value 0-0. Such a deviation or distance value S, respectively, caused by loading or unloading of the air suspension, is corrected by the levelling control, as described. In the corrected distance, the measurement point 6 is to be at the level of the reference value 0-0, and in fact independent of the weight to which the air suspension is subjected.

The approximation speed of the measurement point 6 to the reference level depends, in addition to weight, also on the fed in or discharged volume stream. The automatic levelling control unit 8 exhibits a comparison circuit 10. The characteristics of the volume streams are stored in the comparison circuit 10 and are available for comparison with the signal which depends on the weight of the object. The parameters influencing the characteristics of the volume stream, such as, for example, the power required by the pressure means source for the supply, can be additionally measured such that the tolerance of the signal, dependent on the weight of the object, can be further limited.

Figure 2:
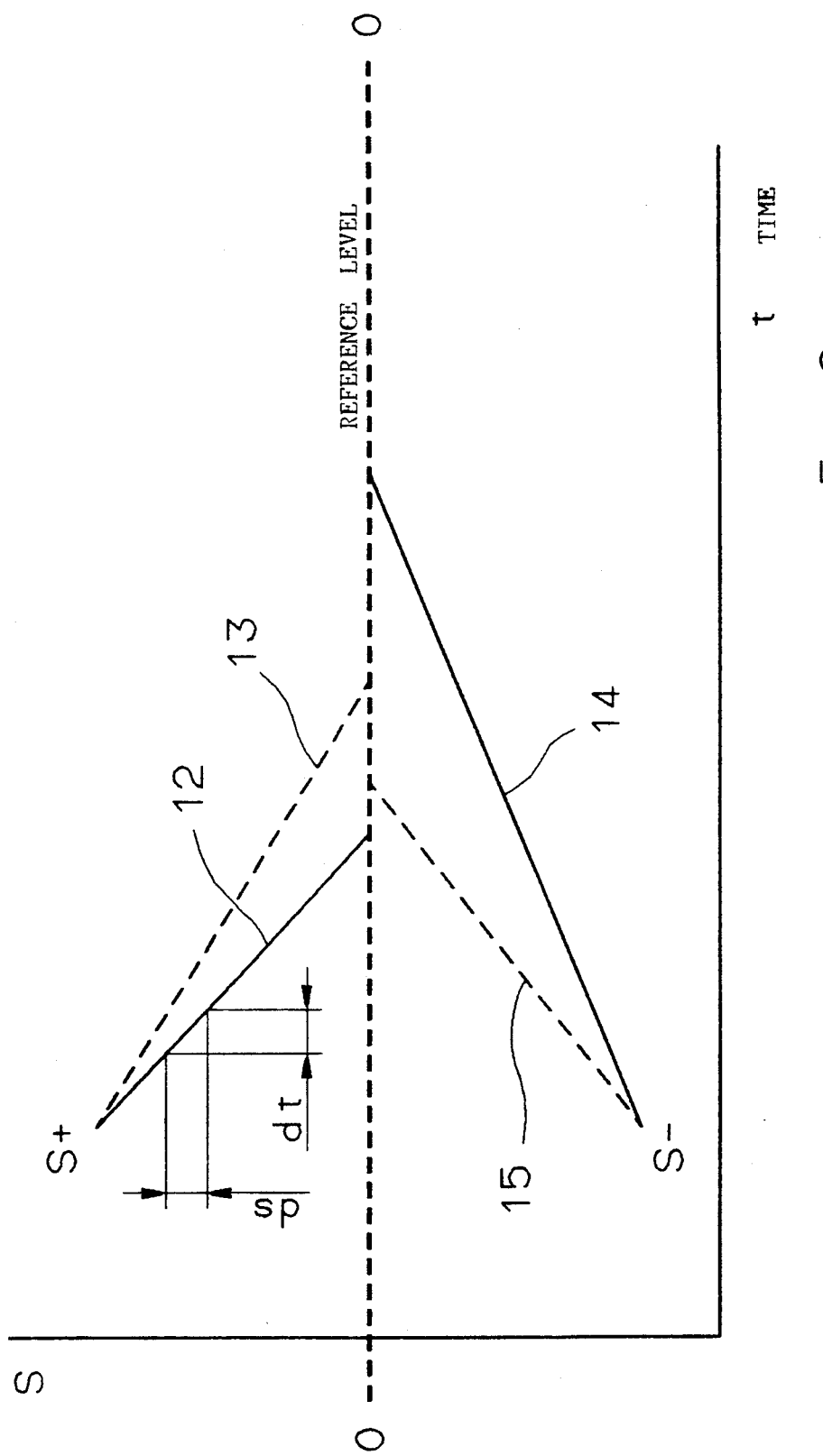
FIG. 2 is a graphic presentation of the load-dependent and time-dependent automatic control values of the unit according to FIG. 1.

FIG. 2 illustrates with an example, representing levelling control processes, the time-dependent distance changes ds./dt at corresponding characterizing curves. The level 0-0 represents the reference level. The characterizing curves 12 and 13 illustrate the level adaptations resulting after the unloading of the vehicle by lowering from a measurement point S(+) to the reference level. The invention weight determination can be carried out starting from any desired load weight. If the load weight is changed, then the reference level 0-0 generates a distance value S based on the deviation of the measurement point 6. The automatic levelling control unit device 8 serves for a restoring the measurement point 6 to the reference level 0-0. The restoring speed, i.e. the change of the distance value S per time unit t, is dependent on the load weight. The signal ds/dt=restoring speed serves therefore as a load-dependent signal for determining the load weight. The distance value S, i.e. the deviation of the measurement point 6 caused by the change of the load weight, does not enter into the process of the generation of the signal ds/dt.

The characterizing curves 14 and 15 illustrate the level adaptations occurring after loading of the vehicle by a raising of a measurement point S(−) to the reference level. The respective inclination angle of the characterizing curves 12, 13, 14, 15, corresponding to the automatic control speed, can be coordinated to the load weight based on a comparison table, which can also be stored in the automatic levelling control unit 8.

The characterizing curves 13 and 15 illustrate automatic control processes of a less loaded vehicle. The characterizing curves 12 and 14 illustrate automatic control processes of a more loaded vehicle. Based on the different inclination of the characterizing curves and on the information whether a pressurizing or venting process is taking place, the respective suspended weight G depends on the coordinated characterizing curve.

In case of a controlled level, the distance value S=0, i.e. the measurement point 6 is disposed at the level of the reference level. The air suspension can now be subjected to any desired load weight. For example, if one adds an additional weight to a large load weight, then the restoring speed occurs for instance according to the characterizing curve 14. Accordingly, in case of a lower load weight, the same process is accelerated according to the characterizing curve 15, i.e. the characterizing curve 15 is steeper as compared to the characterizing curve 14. The inclination of the characterizing curves, i.e. the signal ds/dt can be measured at any desired point of the restoring. It results from the above that the distance value S, in the sense of the recited compression or rebound, does not play a part in this measurement process.

For example, if a portion of the load is removed from an excessive load weight, then the restoring speed occurs for example according to the characterizing curve 12. Starting with a load weight which is too low, the identical process would procede with a flatter characterizing curve 13 as compared to the characterizing curve 12 because the lower load weight can have a correspondingly lower influence on the restoring procedure to the reference level 0-0 than an excessive load weight.

Figure 3:
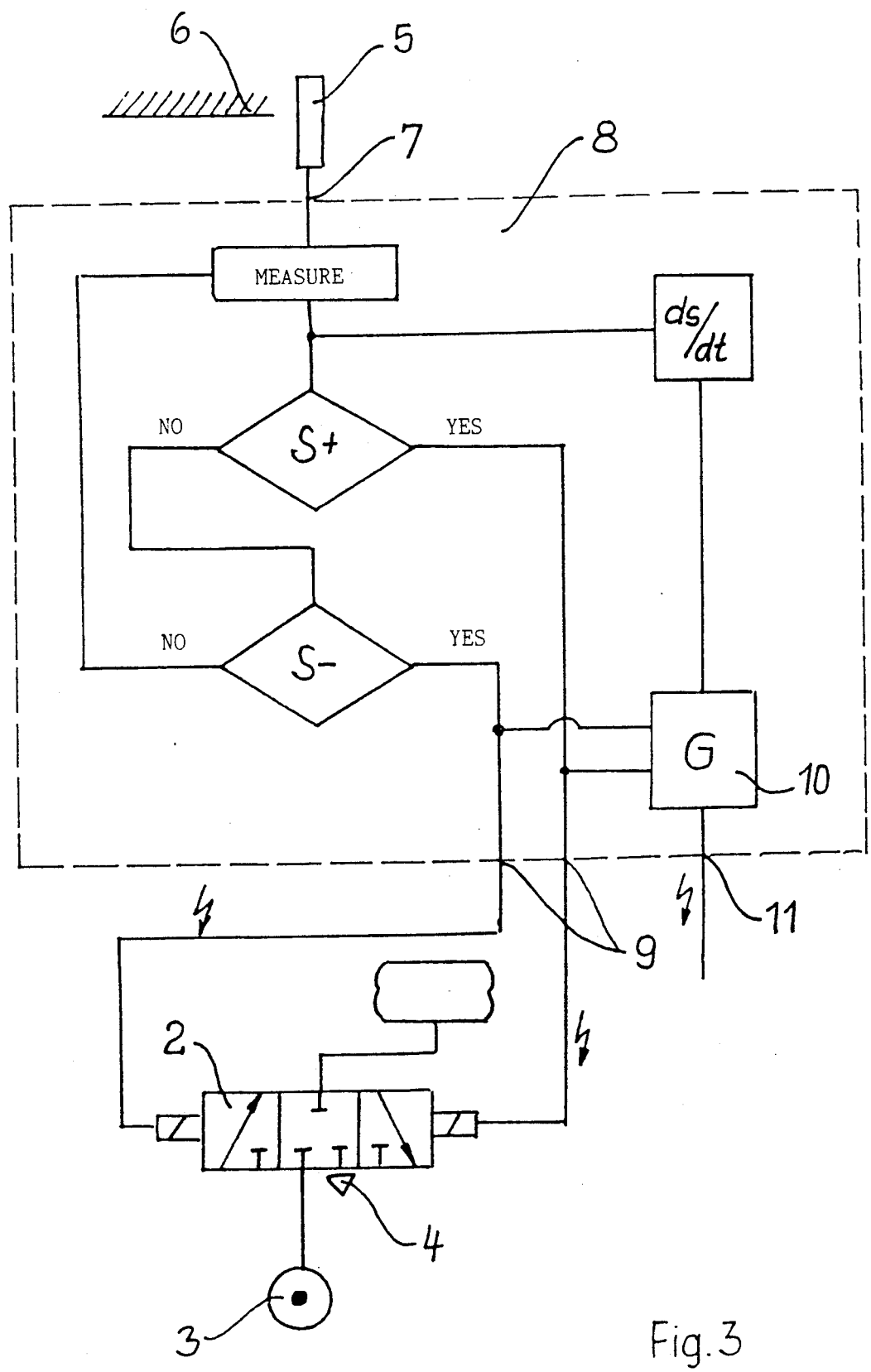
FIG. 3 is a schematic diagram of the invention method.

The function diagram of FIG. 3 represents the automatic levelling control unit including the connection with the signal ds/dt, as well as the connection of the distance values S+, S− with the signal ds/dt for formation of a signal corresponding to the weight G.

The application of the invention device is not limited to the automatic levelling control unit of a vehicle described in the embodiment. It can also be employed, for example, in case of a scale, where a deviation of a measurement point from a reference level is generated by the object to be weighed and where the approximation of the measurement point to the reference level can be captured under the preceding described condition.

It will be understood that each of the elements described above, or two or more together, may also find a useful application in other types of signal devices differing from the types described above.

While the invention has been illustrated and described as embodied in the context of an apparatus for generating a signal, where the signal depends on a weight of an object, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An apparatus for generating a signal dependent on a weight of an object, comprising
   an object;
   a pressure source;
   an air suspension supporting the object and connected to the pressure source for pressurizing the air suspension with air and to a discharge port for venting the air from the air suspension into ambient atmosphere;
   a distance measurement device employed for generating a distance value dependent on a distance of a reference point relative to a reference level;
   an automatic control unit for level adjustment connected to the distance measuring device for generating an additional signal dependent on a temporary change of a distance value during a time during which the reference point approaches the reference level during an automatic control operation, said automatic control unit serving for controlling the reference point subjected to an influence of the weight of the object and movable in a vertical direction to the reference level by pressurizing and venting of the air suspension, and wherein the additional signal serves as a measurement of a change rate of the distance value with respect to time that can be used to determine weight.

2. The apparatus according to claim 1, further comprising
   a comparison circuit connected to the automatic control unit for level adjustment, wherein the distance measurement device is disposed at and coordinated to the automatic control unit for level adjustment for generating a distance path length value.

3. The apparatus according to claim 1 comprising
   a comparison circuit connected to and disposed at the automatic control unit for level adjustment;
   storage means connected to the comparison circuit for storing characteristics of air volume streams, fed to the air suspension or discharged by the air suspension, for ready availability of said characteristics for comparison purposes with the signal dependent on the weight of the object.

4. The apparatus according to claim 1, wherein
   a physical parameter value of a generated signal depends substantially linearly on the weight of the object.

5. The apparatus according to claim 1, wherein
   a physical parameter value of a generated signal assumes positive and negative values dependent on a positive/negative sign of a difference between the weight of the object and a preset reference weight.

6. The apparatus according to claim 1, wherein
   the automatic control unit comprises a differentiating means for differentiating a measured signal value dependent on time.

7. The apparatus according to claim 6, wherein
   the automatic control unit produces a second signal derived from the differentiating means for immediately furnishing the weight of a load determined by a system.

8. An apparatus for generating a signal, where the signal depends on a weight of an object, comprising
   a) an air suspension supporting the object, where the air suspension can be connected to a pressure source for pressurizing and to a discharge to atmosphere for venting;
   b) an automatic levelling control unit, which serves for controlling a measurement point, adjustable under influence of the weight of the object to a reference level, by pressurizing and venting of the air suspension;
   c) a distance measurement device employed for generating a distance value dependent on a distance of the measurement point relative to the reference level;
   d) wherein the automatic levelling control unit is structured such that said control unit generates an additional signal, dependent on a temporary change of the distance value (S) during a time during which the measurement point approaches the reference level during automatic control;
   e) wherein the additional signal serves as a measurement of a change rate of the distance value with respect to time that can be used to determine weight.

9. The apparatus according to claim 8, wherein a distance measurement device disposed at and coordinated to the automatic levelling control unit serves for generating a distance value.

10. The apparatus according to claim 8,
    wherein the automatic levelling control unit exhibits a comparison circuit, wherein characteristics of volume streams of air, fed to the air suspension or discharged by the air suspension, are stored in the comparison circuit; and
    wherein said characteristics of the volume streams of air are available for comparison purposes with the additional signal depending on the weight of the object.

11. The apparatus according to claim 1 wherein said automatic control unit provides dynamic measurement of a loading weight.

12. The apparatus according to claim 1 wherein said automatic control unit operates during a transport of the object.

13. An apparatus for generating a signal dependent on a weight of an object, comprising a distance measurement device employed for generating a distance value dependent on a distance of a reference point relative to a reference level; an automatic control unit for level adjustment connected to the distance measuring device for generating an additional signal dependent on a temporary change of a distance value during a time during which the reference point approaches the reference level during an automatic control operation, said automatic control unit serving for controlling the reference point subjected to an influence of the weight of an object and movable in a vertical direction to the reference level by pressurizing and venting of an air suspension adapted for supporting the object and connectable to a pressure source for pressurizing the air suspension with air and to a discharge port for venting the air from the air suspension into ambient atmosphere, and wherein the additional signal serves as a measurement of a change rate of the distance value with respect to time that can be used to determine weight.

14. The apparatus according to claim 13, further comprising
a comparison circuit connected to the automatic control unit for level adjustment, wherein the distance measurement device is disposed at and coordinated to the automatic control unit for level adjustment for generating a distance path length value.

15. The apparatus according to claim 13, further comprising a comparison circuit connected to and disposed at the automatic control unit for level adjustment;
storage means connected to the comparison circuit for storing characteristics of air volume streams, fed to the air suspension or discharged by the air suspension, for ready availability of said characteristics for comparison purposes with the signal dependent on the weight of the object.

16. The apparatus according to claim 13, wherein
a physical parameter value of a generated signal depends substantially linearly on the weight of the object.

17. The apparatus according to claim 13, wherein
a physical parameter value of a generated signal assumes positive and negative values dependent on a positive/negative sign of a difference between the weight of the object and a preset reference weight.

18. The apparatus according to claim 13, wherein
the automatic control unit comprises a differentiating means for differentiating a measured signal value dependent on time.

19. The apparatus according to claim 18, wherein the automatic control unit produces a second signal derived from the differentiating means for immediately furnishing the weight of a load determined by a system.

20. The apparatus according to claim 13 wherein said automatic control unit provides a dynamic measurement of a loading weight.

21. The apparatus according to claim 13 wherein said automatic control unit operates during a transport of the object.

22. An apparatus for generating a signal dependent on a weight of an object, comprising
an air suspension for supporting an object and connectable to a pressure source for pressurizing the air suspension with air and to a discharge port for venting the air from the air suspension into ambient atmosphere;
a distance measurement device employed for generating a distance value dependent on the distance of a reference point relative to a reference level;
an automatic control unit for level adjustment connected to the distance measuring device for generating an additional signal dependent on a temporary change of a distance value during a time during which the reference point approaches the reference level during an automatic control operation, said automatic control unit serving for controlling a reference point subjected to an influence of the weight of the object and movable in a vertical direction to the reference level by pressurizing and venting of the air suspension, and wherein the additional signal serves as a measurement of a change rate of the distance value with respect to time that can be used to determine weight.

* * * * *